C. A. BRINLEY & R. H. BOWEN.
PULLEY AND ATTACHMENT THEREFOR.
APPLICATION FILED FEB. 25, 1910.
957,845.
Patented May 10, 1910.
2 SHEETS—SHEET 1.
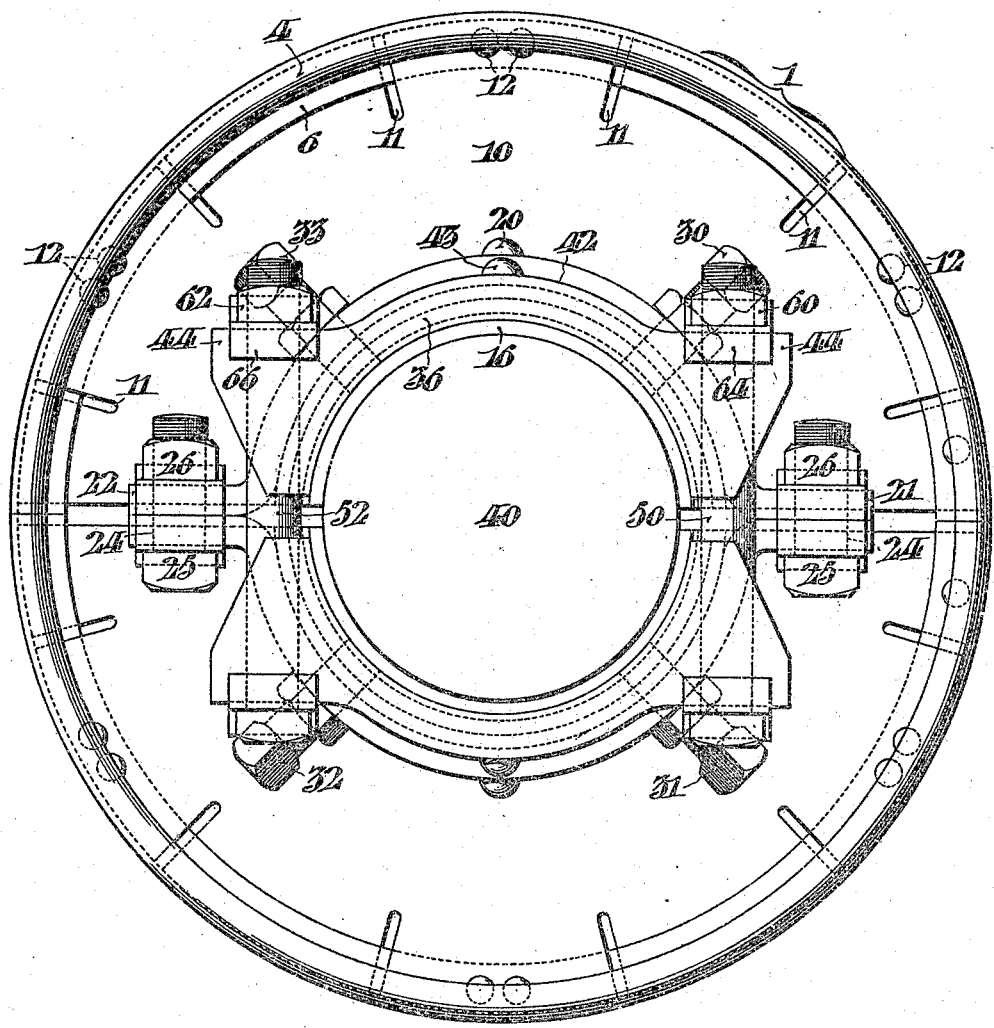
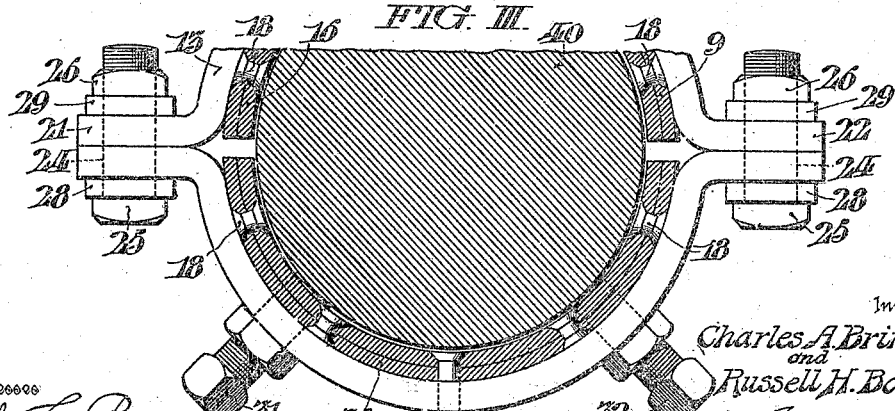

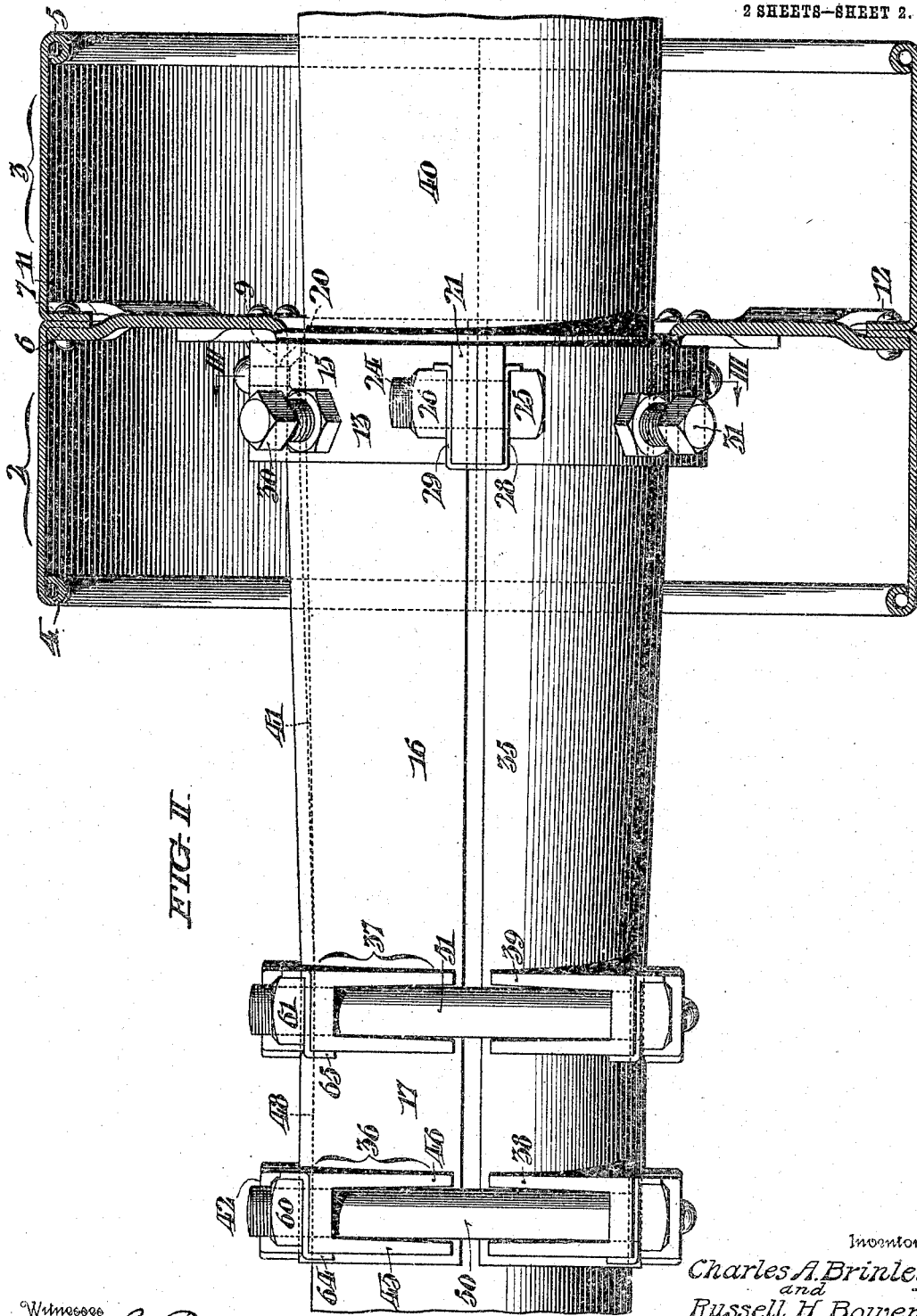

UNITED STATES PATENT OFFICE.

CHARLES A. BRINLEY, OF PHILADELPHIA, PENNSYLVANIA, AND RUSSELL H. BOWEN, OF PALMYRA, NEW JERSEY, ASSIGNORS TO THE AMERICAN PULLEY COMPANY, OF PHILADELPHIA, PENNSYLVANIA, A CORPORATION OF PENNSYLVANIA.

PULLEY AND ATTACHMENT THEREFOR.

957,845.     Specification of Letters Patent.      Patented May 10, 1910.

Application filed February 25, 1910. Serial No. 545,805.

*To all whom it may concern:*

Be it known that we, CHARLES A. BRINLEY, of Philadelphia, in the county of Philadelphia and State of Pennsylvania, and RUSSELL H. BOWEN, of Palmyra, in the county of Burlington and State of New Jersey, have invented certain new and useful Improvements in Pulleys and Attachments Therefor, whereof the following is a specification, reference being had to the accompanying drawings.

The object of our invention is to provide a pulley and attachment adapted for efficient use in connection with a shaft, or axle, having a tapered portion at or near the region directly embraced by the pulley. As a typical instance of the use contemplated for the device, we refer to the mounting of a driving pulley upon a railway-car axle in order to actuate a dynamo carried by the car, but it is obvious that the invention is adapted to other purposes where similar conditions of mounting obtain.

Referring to the drawings, Figure I, represents a side elevation of the pulley and attaching member, the point of view being from that side which is at the left in Fig. II. Fig. II, represents a vertical section through the pulley and a side elevation of the attaching member. Fig. III, is a transverse section through the attaching member, and the adjacent hub element of the pulley, on the line III, III, in Fig. II.

The pulley and its attachment belong to that class which are termed "split", in that they are composed of two substantially similar half-portions, symmetrically constructed with relation to a diametrical plane, upon which plane they are secured together, the object of this construction being to facilitate application to a shaft or similar mounting. Owing to this similarity of construction, the detailed description about to be given is accompanied by reference numerals which in the drawings are only applied to one of said half-portions.

Each of the parts of the pulley proper comprises a rim 1, preferably composed of two semi-circular bands 2, and 3, respectively, preferably provided with circumferential beads or flanges 4, and 5, respectively at their external peripheries, and also having inwardly projecting flanges 6, and 7, respectively, at their proximate edges. The two elements of the rim are united to one another, and to a radial semi-circular plate 10, whose curved periphery is radially slotted at intervals, as shown at 11, the portions between the respective slots being alternately bent on either side of the median line of the plate, so as to embrace the inwardly projecting flanges 6, and 7, of the rim elements. Fastening devices, such as rivets 12, pass through the pair of flanges, and the proximate portion of the periphery at suitable intervals. The portion of the plate 10, adjacent to the center of the circle of which it forms a half, is extended laterally so as to form a semi-cylindrical half-hub portion 9, whose surface is substantially perpendicular to the median plane of the plate. We prefer to employ such a continuous plate, instead of divided spokes, as the means of mounting the pulley rim upon the hub, but it must be understood that such structural detail is not essential and that the plate may be approximately considered as a spoke element. Said half-hub is embraced upon its outer periphery by a semi-annular band 13, and embraces, on its inner periphery, the semi-cylindrical end of an elongated bearing element which we term the half-barrel. Said half-barrel has the shape shown in Fig. II, that is to say, the semi-cylindrical inner end portion 15, merges into a conical or tapered middle portion 16, which extends for some distance and then again terminates in a semi-cylindrical outer end portion 17. The half-hub is secured to the half-barrel by means of rivets 18, arranged at suitable intervals, and the band is secured at its longitudinal middle to both of the half-hub and the half-barrel by means of a rivet 20, which passes through all three of the parts, leaving the portions of the band which are on either side of said rivet 20, free from any positive attachment to said other parts. The ends of the band 13, are bent outward and extended in a radial direction, so as to form deep flanges 21, and 22, respectively, whose extreme faces lie substantially in the diametrical plane of division of the pulley.

Assuming it to be understood that the other half-part of the pulley, and of the barrel are substantially identical with the structure just described, we will now proceed to specify the elements whereby the half-parts are secured together and clamped upon the axle, and the pulley proper is centered with relation thereto. Bolts 24, having heads 25, and nuts 26, extend through holes in the flanges 21, and 22, and their proximate counterparts upon the other band. Locking washers such as 28, and 29, are preferably located between the face of each flange and the bolt-head or nut adjacent thereto, the ends of said washers being bent up after the bolts have been screwed home, so as to lock the parts. At suitable intervals in the circumference of the band 13, and its counterpart, and preferably in quadrant relation, as shown, are mounted radial set-screws 30, 31, 32, and 33, respectively, whose ends are capable of protrusion beyond the inner faces of the half-barrels, so that said screws may be applied to bear upon the surface of the car axle 40, in proximity to the median plane of the pulley. Upon the outer end of the half-barrel 16, and its fellow 35, are mounted arched clamping-pieces 36, 37, 38, and 39, and as all four of these are similar, it is only necessary to specify the details of one thereof. For this purpose the upper clamping piece 36, at the left hand extremity in Fig. II, (and which is at the top and nearest the observer in Fig. I), will now be described. Said clamping-piece comprises a segmental middle portion 42, which fits snugly upon the outer surface of the half-barrel 16, and is centrally secured to the latter, by means of a rivet 43. The two extremities of the clamping-piece are extended outwardly to form bracket shaped projections 44, whose upper surfaces are parallel to the diametrical plane of division of the pulley, and whose lower portions are bifurcated, forming the depending arms 45, and 46, the inner edges of which are curved concentrically with the middle portion 42, of the band to fit upon the external surface of the half-barrel 16. The middle portion 42, of the clamping-piece is somewhat wider than the end or bracket portions, as indicated in the view of Fig. II, where the convergence of the vertical sides toward the end facing the observer will be noted. Each half-barrel is provided with two of said clamping-pieces, as above stated, and the two portions of the half-barrel are clamped tightly upon the surface of the axle 40, by means of four bolts, three of which 50, 51, and 52, are shown in the drawings. Said bolts are provided with nuts 60, 61, and 62, respectively, and may also be furnished with locking washers 64, 65, 66, respectively. The clamping-pieces 36, 37, 38, and 39, are preferably castings, but the pulley rim, radial plates with their half-hubs, bands and half-barrels are preferably made of sheet steel pressed into the desired shape by means of dies.

We will now describe the method of mounting the device upon an axle, such as that shown at 40, having a tapered portion at the region indicated by the dotted lines 41, and having a cylindrical end portion 48. The two half-parts are applied so as to embrace said axle, and the nuts upon the bolts 50, 51, etc., of the clamping-pieces 36, 37, 38, and 39, are screwed home, so that the outer end portions of the half-barrels are firmly clamped upon the cylindrical part of the axle. The pulley proper is then centered in true relation to the axis of rotation by means of the set screws 30, 31, etc., which bear forcibly against the surface of the axle in proximity to the median plane of the pulley, said screws also aiding in resisting the torsional strain.

It will be noted that the above described device is peculiarly applicable to the instance of use above mentioned as typical, since it is usually desirable to have the driving pulley located beneath the car at a region above a part of the axle, which is either wholly tapering or where an insufficient cylindrical surface would be afforded for a direct clamping of the pulley thereto, if the bearing surfaces were restricted to such limited part.

As is well known, it is exceedingly difficult, if not impracticable to secure a pulley satisfactorily upon a tapering axle or shaft, and hence our invention attains the desired object, since it permits the substantial or main clamping action to be applied at a cylindrical part of the axle, even though such part be relatively remote from the desired location for the pulley itself, and insures the proper centering and firm retention of the pulley although the latter directly embraces a portion of the axle which would afford an insufficient or undesirable bearing surface.

For convenience of nomenclature, we shall in some of our claims, refer to certain of the half-parts in their combined relation, as constituting an entire rim, hub or barrel, and shall designate that end of the barrel which is most remote from the pulley as the outer end.

Having thus described our invention, we claim:—

1. In a divided pulley, the combination, with the rim and spoke elements; of an extended barrel, having a bearing surface at its outer end of substantially cylindrical contour, and having its remaining portion adapted to embrace a shaft of different diameter from that of said cylindrical portion; clamping means arranged in proximity to said cylindrical portion; and centering devices arranged adjacent to the pulley, whereby the outer end of the barrel may be clamped to bear upon a substantially cylindrical surface and the pulley may be centered upon a surface of different diameter from the first mentioned one.

2. In a divided pulley, the combination with the rim, and spoke elements; of a laterally projecting hub element; a tapering barrel element, one extremity of which fits within said hub element; clamping bands embracing the exterior of said hub element; means for securing said clamping bands, barrel and hub element together; and clamping devices arranged in proximity to the outer extremity of said barrel, substantially as set forth.

3. In a divided pulley, the combination with the rim and spoke elements; of a laterally projecting hub element; a tapering barrel element, one extremity of which fits within said hub element; clamping bands embracing the exterior of said hub element; means for securing said clamping bands, barrel and hub element together; clamping devices arranged in proximity to the outer extremity of said barrel; and centering devices extending through the barrel at the region of said hub element.

4. In a divided pulley, the combination of a rim element comprising flat bands having inwardly extending flanges at their proximate edges; a spoke element provided with portions adapted to embrace said flanges and arranged alternately on opposite sides of the median line of said spoke element; a hub element integral with said spoke element and extending laterally therefrom; an extending tapering barrel element attached to said hub element; clamping bands adapted to embrace the hub element at the region of attachment of the barrel thereto; clamping devices arranged at the outer extremity of the barrel; and centering devices arranged at the region of the hub, substantially as set forth.

In testimony whereof, we have hereunto signed our names at Philadelphia, Pennsylvania, this twenty-third day of February, 1910.

CHARLES A. BRINLEY.
RUSSELL H. BOWEN.

Witnesses:
JAMES H. BELL,
E. L. FULLERTON.